(12) United States Patent
Schote

(10) Patent No.: US 8,286,979 B2
(45) Date of Patent: Oct. 16, 2012

(54) REAR AXLE OF MOTOR VEHICLE

(75) Inventor: Norbert Schote, Ammerbuch (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 13/041,914

(22) Filed: Mar. 7, 2011

(65) Prior Publication Data

US 2011/0221155 A1  Sep. 15, 2011

(30) Foreign Application Priority Data

Mar. 12, 2010  (DE) .......................... 10 2010 012 014

(51) Int. Cl.
*B60G 9/02* (2006.01)

(52) U.S. Cl. ................ 280/124.117; 280/99; 280/124.1; 280/124.135

(58) Field of Classification Search ........... 280/124.117, 280/124.1, 124.135, 124.136, 99
See application file for complete search history.

(56) References Cited

U.S. PATENT DOCUMENTS 5,071,156 A  12/1991  Kanai et al.
5,080,185 A  1/1992  Kondo et al.

FOREIGN PATENT DOCUMENTS

| DE | 3924950 A1 | 7/1988 |
| DE | 3912924 A1 | 5/1990 |
| DE | 4030819 A1 | 4/1991 |
| DE | 102007024755 A1 | 11/2008 |

*Primary Examiner* — Eric Culbreth
(74) *Attorney, Agent, or Firm* — RatnerPrestia

(57) ABSTRACT

A rear axle, specifically a steerable rear axle, of a motor vehicle, has wheel carriers for holding in each case one rear wheel, with in each case one upper transverse link, one lower transverse link and one track rod interacting with each rear wheel, and with the track rods being positioned behind a center of the rear wheels or of the wheel carriers as viewed in the longitudinal direction of the motor vehicle, wherein both track rods which are positioned in each case behind the center of the rear wheels or of the wheel carriers as viewed in the longitudinal direction of the motor vehicle are engaged on by a common steering actuator which is likewise positioned in each case behind the center of the rear wheels or of the wheel carriers as viewed in the longitudinal direction of the motor vehicle.

7 Claims, 4 Drawing Sheets

REAR AXLE OF MOTOR VEHICLE

CROSS REFERENCE TO RELATED APPLICATION

This U.S. patent application claims priority to German Patent Application No. 102010012014.6, filed Mar. 12, 2010, which is incorporated by reference herein in its entirety.

FIELD OF THE INVENTION

The invention relates to a rear axle of a motor vehicle.

BACKGROUND OF THE INVENTION

DE 39 12 924 A1, which is incorporated by reference herein, discloses a steerable axle of a motor vehicle having wheel carriers for holding in each case one vehicle wheel, with each wheel carrier of the steerable axle disclosed in said document being assigned in each case one upper transverse link, one lower transverse link and one track rod. The track rods assigned to the wheel carriers are positioned behind a center of the vehicle wheels or of the wheel carriers of the steerable axle as viewed in the longitudinal direction of the motor vehicle or in the direction of travel. The upper transverse links and lower transverse links engage in each case with a connecting point on the respective wheel carrier in the center of the wheel carrier or in the center of the vehicle wheel held on the wheel carrier.

SUMMARY OF THE INVENTION

Taking this as a starting point, the present invention relates to the problem of providing a novel rear axle of a motor vehicle.

Said problem is solved by means of a rear axle of a motor vehicle having wheel carriers for holding in each case one rear wheel, with in each case one upper transverse link, one lower transverse link and one track rod interacting with each rear wheel, and with the track rods being positioned behind a center of the rear wheels or of the wheel carriers as viewed in the longitudinal direction of the motor vehicle, wherein both track rods which are positioned in each case behind the center of the rear wheels or of the wheel carriers as viewed in the longitudinal direction of the motor vehicle are engaged on by a common steering actuator which is likewise positioned in each case behind the center of the rear wheels or of the wheel carriers as viewed in the longitudinal direction of the motor vehicle. According to aspects of the invention, both track rods which are positioned in each case behind the center of the rear wheels or of the wheel carriers as viewed in the longitudinal direction of the motor vehicle are engaged on by a common steering actuator which is likewise positioned in each case behind the center of the rear wheels or of the wheel carriers as viewed in the longitudinal direction of the motor vehicle.

The present invention proposes a completely novel concept for a steerable rear axle of a motor vehicle. The track rods which interact with the wheel carriers of the rear wheels are positioned in each case behind the center of the rear wheels or the center of the wheel carriers as viewed in the longitudinal direction of the motor vehicle or in the direction of travel, with said two track rods being engaged on by a common or central steering actuator for the steerable rear axle, which steering actuator is likewise positioned behind the center of the rear wheels or of the wheel carriers as viewed in the longitudinal direction of the motor vehicle or in the direction of travel. Such a rear axle may particularly preferably be integrated into a motor vehicle.

According to one advantageous refinement of the invention, the upper transverse links are connected in each case with a first connecting point to the respective wheel carrier and with a second connecting point to a subframe, wherein in the region of each upper transverse link, the first and the second connecting points are positioned in front of the center of the rear wheels or of the wheel carriers as viewed in the longitudinal direction of the motor vehicle. Said configuration of the connecting points for the upper transverse links permits particularly advantageous support of camber moments.

According to a further advantageous refinement of the invention, the lower transverse links are connected in each case with a first connecting point to the respective wheel carrier and with a plurality of second connecting points to the subframe, wherein in the region of each lower transverse link, the first connecting point and one of the second connecting points are positioned in front of the center of the rear wheels or of the wheel carriers as viewed in the longitudinal direction of the motor vehicle, and one of the second connecting points is positioned behind the center of the rear wheels or of the wheel carriers as viewed in the longitudinal direction of the motor vehicle. Said configuration of the connecting points for the lower transverse links permits particularly preferable support of braking torques and drive torques.

It is preferable for the first connecting point of the upper transverse link to the respective wheel carrier to be situated behind the first connecting point of the lower transverse link to the respective wheel carrier as viewed in the longitudinal direction of the motor vehicle, such that an axis extending through said connecting points is inclined rearward as viewed from bottom to top. The above inclination of the axis extending through these connecting points makes it possible to obtain a negative camber change during steering movements with toe-in.

According to an advantageous refinement of the invention, the lower transverse links are supported on the respective wheel carrier in each case via a coupler, with the respective coupler extending behind the center of the rear wheels or of the wheel carriers as viewed in the longitudinal direction of the motor vehicle. Braking torques and drive torques can be supported in a particularly preferable manner by means of the use of the couplers.

Preferred refinements of the invention will emerge from the following description.

BRIEF DESCRIPTION OF THE DRAWINGS

Exemplary embodiments of the invention, to which the invention is not restricted, will be explained in more detail on the basis of the drawing, in which.

DETAILED DESCRIPTION OF THE DRAWINGS

Figure 1:
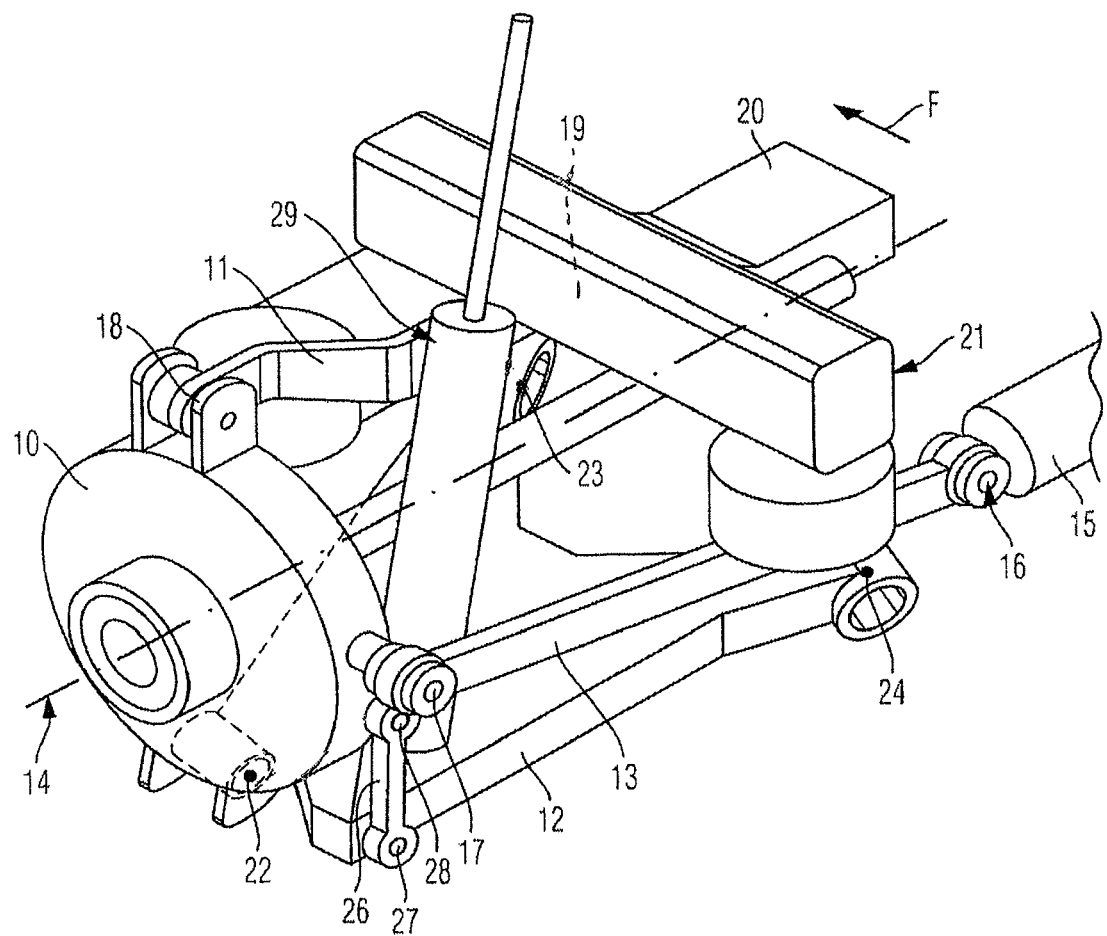
FIG. 1 shows a detail of a rear axle of a motor vehicle according to aspects of the invention, in a perspective view.

The present invention relates to a rear axle, specifically a steerable rear axle of a motor vehicle, wherein a rear axle of said type comprises two wheel carriers for holding in each case one rear wheel.

FIGS. 1 to 4 show details of a rear axle of a motor vehicle according to aspects of the invention in the region of a wheel carrier for holding a rear wheel.

An upper transverse link 11, a lower transverse link 12 and a track rod 13 interact with each wheel carrier 10 of the steerable rear axle according to aspects of the invention.

The track rods 13 are positioned behind a center of the rear wheels or a center of the wheel carriers 10 as viewed in the longitudinal direction F of the motor vehicle and therefore in the direction of forward travel, with the center of the rear wheels or wheel carriers 10 being situated on an axis 14.

Figure 2:
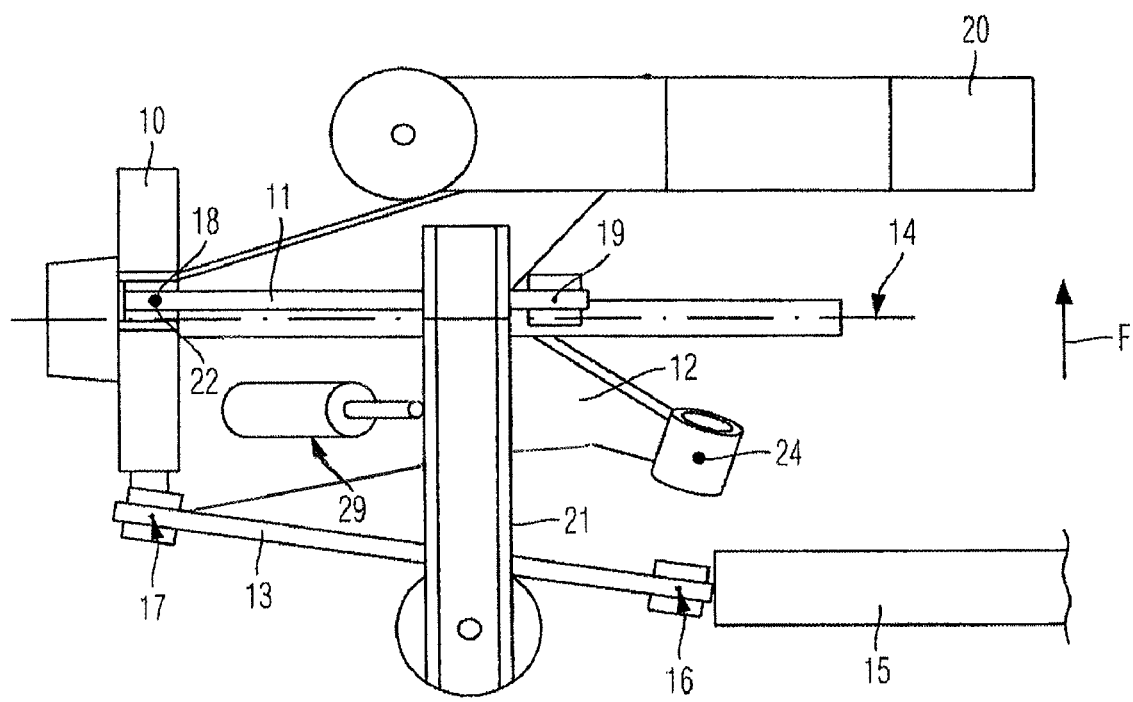
FIG. 2 shows the detail of FIG. 1 in a plan view.

Assigned to both track rods 13, which are assigned to the two wheel carriers 10 of the steerable rear axle according to aspects of the invention, is a common or central steering actuator 15 which is likewise positioned behind the axis 14 and therefore behind the center of the rear wheels or the center of the wheel carriers 10 as viewed in the longitudinal direction F of the motor vehicle, as can be seen most clearly from FIGS. 1 and 2.

As can be seen from FIG. 1, the track rod 13 shown in FIGS. 1 and 2 engages in an articulated fashion on the common or central steering actuator 15 at a first connecting point 16 and on the respective wheel carrier 10 at a second connecting point 17.

The upper transverse links 11 are articulatedly connected in each case with a first connecting point 18 to the respective wheel carrier 10 and with a second connecting point 19 to a subframe 20.

The subframe 20 serves to connect the steerable rear axle to a body structure, with a longitudinal beam 21 of the body structure being shown.

In the region of each upper transverse link 11, said two connecting points 18 and 19 are positioned in each case in front of the center of the rear wheels or the center of the wheel carriers 10, and therefore in front of the axis 14, as viewed in the longitudinal direction F of the motor vehicle. Here, the upper transverse links 11 are situated directly or a short distance in front of the axis 14, and therefore the center of the wheel carriers 10, as viewed in the longitudinal direction F. Said connection of the upper transverse links 11 permits advantageous support of camber moments.

The lower transverse links 12 are articulatedly connected in each case with a first connecting point 22 to the respective wheel carrier 10 and with a plurality of second connecting points 23 and 24, specifically two second connecting points in the exemplary embodiment shown, to the subframe 20. It can be seen in particular from FIG. 2 that, in the region of each lower transverse link 12, the respective first connecting point 22, by means of which the respective transverse link 12 is connected to the respective wheel carrier 10, is situated in front of the axis 14, and therefore in front of the center of the rear wheels or of the respective wheel carrier 10, as viewed in the longitudinal direction F of the motor vehicle. Likewise, a first of the second connecting points, specifically the connecting point 23, is situated in front of the axis 14, and therefore in front of the center of the respective wheel carrier 10, as viewed in the longitudinal direction F of the motor vehicle, whereas a second of said second connecting points, specifically the connecting point 24, is situated behind the axis 14, and therefore behind the center of the respective wheel carrier 10, as viewed in the longitudinal direction F of the motor vehicle. Braking torques and drive torques can be absorbed in a particularly preferable manner in this way.

Figure 3:
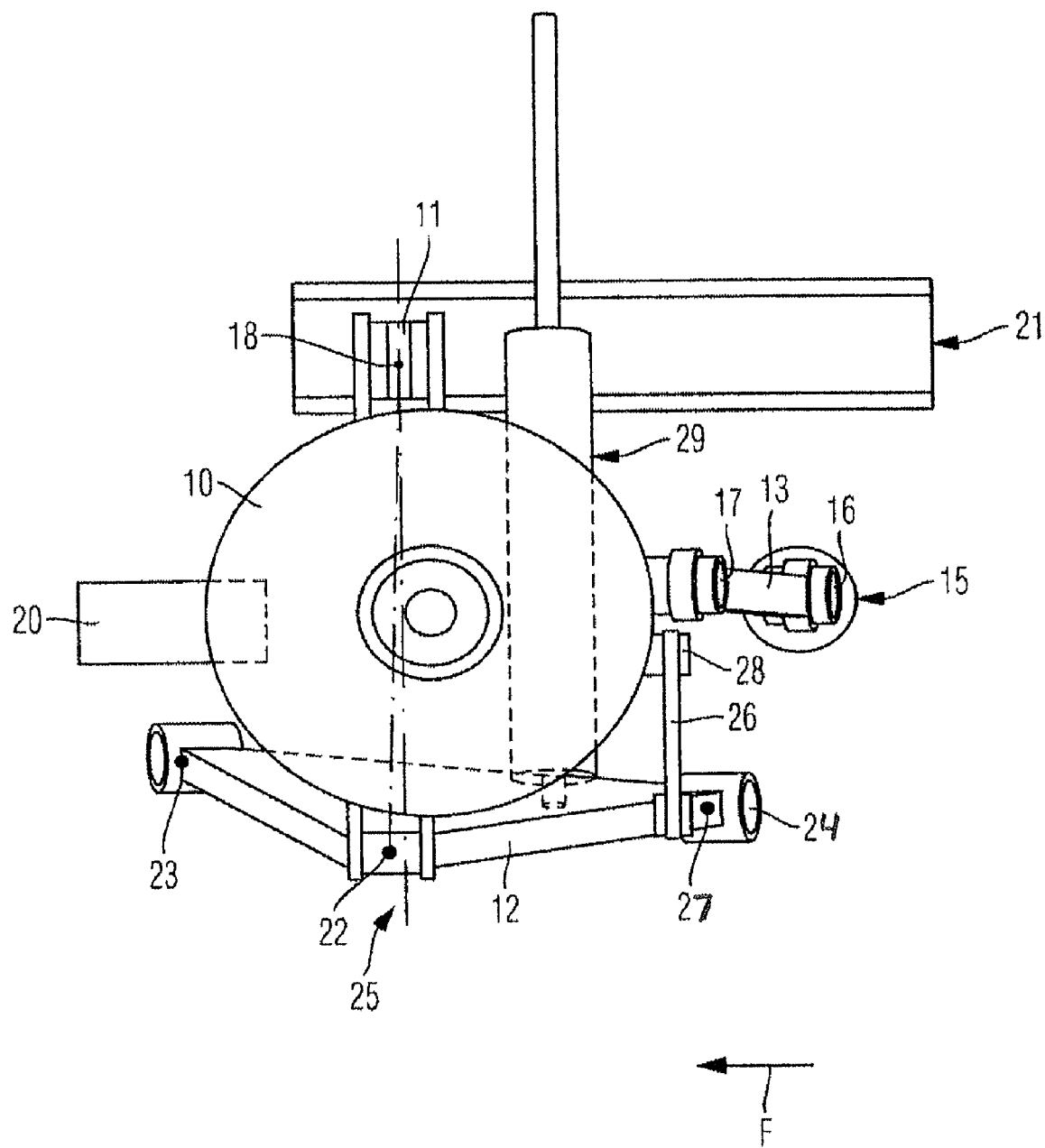
FIG. 3 shows the detail of FIG. 1 in a side view.
Figure 4:
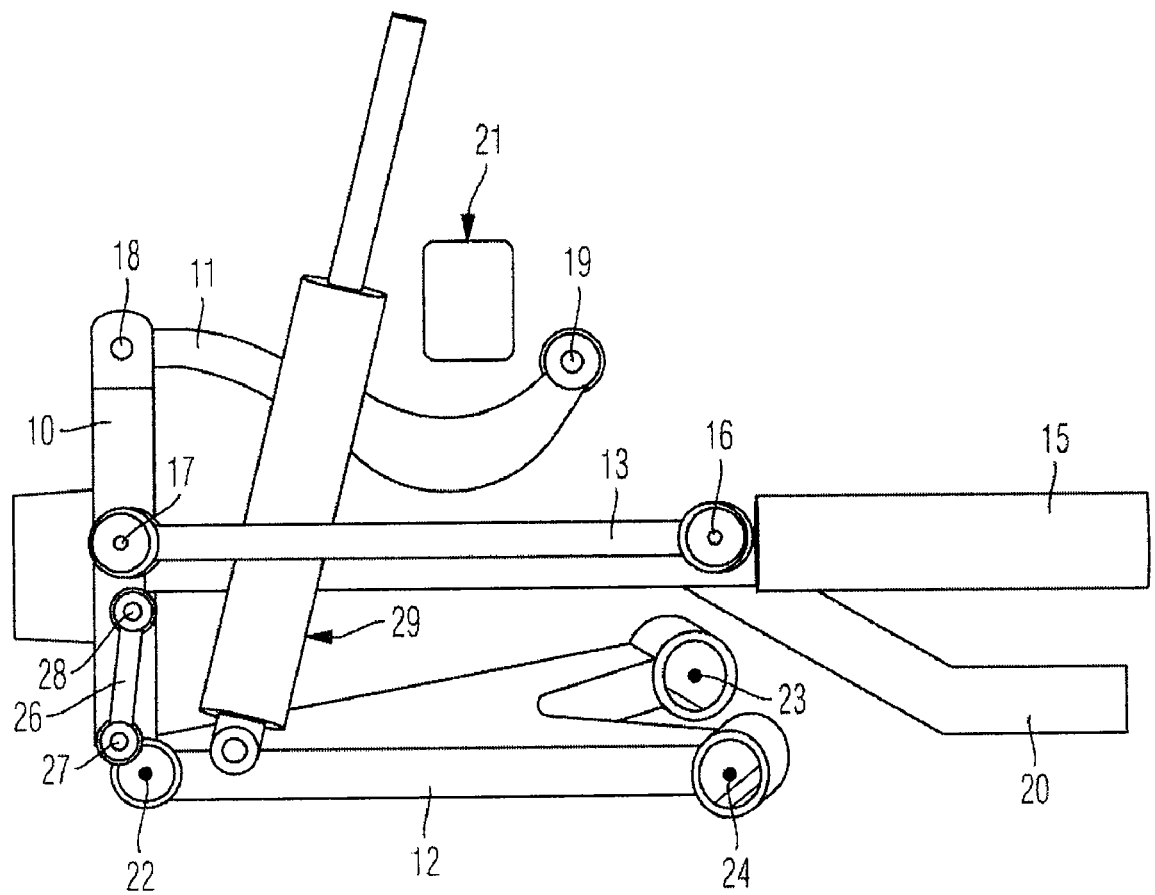
FIG. 4 shows the detail of FIG. 1 in a view from the rear.

As can be seen most clearly from FIG. 3, a steering axis 25 extends through the first connecting point 18 of the upper transverse link 11 to the respective wheel carrier 10 and through the first connecting point 22 of the lower transverse link 12 to the respective wheel carrier 10, which steering axis 25 is illustrated by a dashed line in FIG. 3 and, according to FIG. 3, is inclined rearward, that is to say oppositely to the longitudinal direction F of the motor vehicle, as viewed from bottom to top. This inclination is relatively slight and accordingly varies in the range of a few degrees. In this way, it is possible to obtain a negative camber change during steering movements with toe-in.

In addition to the components already mentioned, a coupler 26 also interacts with each wheel carrier 10 of the steerable rear axle according to aspects of the invention. Here, each coupler 26 serves to support the respective lower transverse link 12 on the respective wheel carrier 10, with the respective coupler 26 being positioned behind the center of the wheel carrier 10, and therefore behind the axis 14, as viewed in the longitudinal direction F of the motor vehicle.

Here, each coupler 26 engages with a connecting point 27 on the respective lower transverse link 12 and with a connecting point 28 on the respective wheel carrier 10, wherein said two connecting points 27 and 28 are positioned behind the axis 14 and therefore behind the center of the wheel carriers 10 as viewed in the longitudinal direction F of the motor vehicle. The support of braking torques and drive torques of the rear axle according to aspects of the invention can be further improved through the use of the couplers 26.

The present invention proposes a completely novel concept for a steerable rear axle. The steerable rear axle according to aspects of the invention has a central steering actuator 15, which is positioned behind the center of the wheel carriers 10 as viewed in the longitudinal direction F, specifically together with the track rods 13, which engage at one side on the common steering actuator 15 and at the other side on the respective wheel carrier 10. Connecting points 18 and 19 of the upper transverse links 11 are positioned in front of the center of the wheel carriers 10 in the longitudinal direction F. Likewise, a connecting point 22 of the respective lower transverse link 12 to the respective wheel carrier 10 is positioned in front of the center of the wheel carrier 10 as viewed in the longitudinal direction F, specifically preferably in such a way that, as viewed in the longitudinal direction F, the connecting point 18 of the upper transverse link 11 to the respective wheel carrier 10 is situated behind the connecting point 22 of the lower transverse link 12 to the respective wheel carrier 10, such that the steering axis 25 extending through said connecting points 18, 22 is inclined rearward as viewed from bottom to top. A piercing point of the respective steering axis 25 is situated in front of the center of the respective wheel carrier 10 as viewed in the longitudinal direction F. Connecting points 27 and 28 of couplers 26, by means of which the lower transverse links 12 are additionally coupled to the wheel carriers 10, are situated behind the center of the wheel carriers 10 as viewed in the longitudinal direction F.

A spring-damper system 29 assigned to the respective wheel carrier 10 is supported at one side on the respective lower transverse link 12 and at the other side on a motor vehicle body.

LIST OF REFERENCE NUMERALS

10 Wheel carrier
11 Upper transverse link
12 Lower transverse link
13 Track rod
14 Axis
15 Steering actuator
16 Connecting point
17 Connecting point 18 Connecting point
19 Connecting point
20 Subframe
21 Longitudinal beam
22 Connecting point
23 Connecting point
24 Connecting point
25 Steering axis
26 Coupler
27 Connecting point
28 Connecting point
29 Spring-damper system

The invention claimed is:

1. A steerable rear axle of a motor vehicle comprising:
wheel carriers for holding, in each case, one rear wheel, wherein each wheel carrier includes one upper transverse link, one lower transverse link and one track rod interacting with a respective rear wheel,
wherein the track rods are positioned behind a center of the rear wheels or of the wheel carriers as viewed in a longitudinal direction of the motor vehicle,
wherein the track rods, which are positioned in each case behind the center of the rear wheels or of the wheel carriers as viewed in the longitudinal direction of the motor vehicle, are engaged on by a common steering actuator which is positioned, in each case, behind the center of the rear wheels or of the wheel carriers as viewed in the longitudinal direction of the motor vehicle;
wherein the lower transverse links are supported on the respective wheel carrier, in each case, via a coupler, with the respective coupler extending behind the center of the rear wheels or of the wheel carriers as viewed in the longitudinal direction of the motor vehicle.

2. The rear axle as claimed in claim 1, wherein the upper transverse links are connected, in each case, with a first connecting point to the respective wheel carrier and with a second connecting point to a subframe.

3. The rear axle as claimed in claim 2, wherein, in a region of each upper transverse link, the first and the second connecting points are positioned in front of the center of the rear wheels or of the wheel carriers as viewed in the longitudinal direction of the motor vehicle.

4. The rear axle as claimed in claim 2, wherein the lower transverse links are connected, in each case, with a first connecting point to the respective wheel carrier and with a plurality of second connecting points to the subframe.

5. The rear axle as claimed in claim 4, wherein, in a region of each lower transverse link, the first connecting points and one of the second connecting points are positioned in front of the center of the rear wheels or of the wheel carriers as viewed in the longitudinal direction of the motor vehicle, and one of the second connecting points is positioned behind the center of the rear wheels or of the wheel carriers as viewed in the longitudinal direction of the motor vehicle.

6. The rear axle as claimed in claim 4, wherein the first connecting point of the upper transverse link to the respective wheel carrier is situated behind the first connecting point of the lower transverse link to the respective wheel carrier as viewed in the longitudinal direction of the motor vehicle, such that an axis extending through the first connecting point of the upper transverse and the first connecting point of the lower transverse link is inclined rearward as viewed from bottom to top.

7. The rear axle as claimed in claim 1, wherein the respective coupler is connected with a connecting point to the respective lower transverse link and with a connecting point to the respective wheel carrier, with said two connecting points being positioned behind the center of the rear wheels or of the wheel carriers as viewed in the longitudinal direction of the motor vehicle.

* * * * *